(12) United States Patent
Billet et al.

(10) Patent No.: US 11,329,531 B2
(45) Date of Patent: May 10, 2022

(54) COMPACT CONTROL VALVE

(71) Applicant: MOVING MAGNET TECHNOLOGIES, Besançon (FR)

(72) Inventors: Lionel Billet, Dannemarie sur Crete (FR); Michaël Delbaere, Avanne-Aveney (FR); Valentin Preault, Besançon (FR); Gaël Andrieux, Evilard (CH)

(73) Assignee: Moving Magnet Technologies, Besancon (FR)

( * ) Notice: Subject to any disclaimer, the term of this patent is extended or adjusted under 35 U.S.C. 154(b) by 185 days.

(21) Appl. No.: 16/770,306

(22) PCT Filed: Dec. 5, 2018

(86) PCT No.: PCT/FR2018/053112
§ 371 (c)(1),
(2) Date: Jun. 5, 2020

(87) PCT Pub. No.: WO2019/110923
PCT Pub. Date: Jun. 13, 2019

(65) Prior Publication Data
US 2021/0175777 A1 Jun. 10, 2021

(30) Foreign Application Priority Data
Dec. 8, 2017 (FR) ...................... 1761853

(51) Int. Cl.
*H02K 7/14* (2006.01)
*F16K 31/04* (2006.01)
(Continued)

(52) U.S. Cl.
CPC ............. *H02K 7/14* (2013.01); *F16K 31/047* (2013.01); *F16K 37/0033* (2013.01);
(Continued)

(58) Field of Classification Search
CPC ...... F16K 31/047; H02K 7/14; H02K 11/215; H02K 2201/12
See application file for complete search history.

(56) References Cited

U.S. PATENT DOCUMENTS

| 4,650,156 A | 3/1987 | Kawahira |
| 4,750,514 A * | 6/1988 | Omori ..................... F02D 41/40 137/339 |

(Continued)

OTHER PUBLICATIONS

International Search Report and Written Opinion dated Feb. 21, 2019 in corresponding PCT Application No. PCT/FR2018/053112 (English and French).

*Primary Examiner* — Eric Keasel
(74) *Attorney, Agent, or Firm* — Harness Dickey & Pierce PLC

(57) ABSTRACT

The disclosure relates to a valve for controlling the circulation of a fluid, having a valve body and a housing containing an electric motor composed of a stator and of a rotor, a needle, a sealing bell and also a fixed screw or a fixed nut. The fixed screw or the fixed nut is secured to the valve body, and the stator is secured to the valve body via the housing. The sealing bell is positioned at the interface between the rotor and the stator in such a way that the screw/nut, the rotor and the needle are within this bell and submerged in the fluid, the stator being isolated from the fluid. Furthermore, the rotor has the function of a nut or of a screw, and has a helical movement imposed by the fixed screw or the fixed nut and drives the needle axially. The motor is a brushless polyphase motor with radial principal magnetic flux.

10 Claims, 8 Drawing Sheets

(51) Int. Cl.
  *H02K 11/215* (2016.01)
  *F16K 37/00* (2006.01)
  *H02K 21/16* (2006.01)

(52) U.S. Cl.
  CPC ............ *H02K 11/215* (2016.01); *H02K 21/16* (2013.01); *H02K 2201/12* (2013.01)

(56) References Cited

U.S. PATENT DOCUMENTS

| | | | |
|---|---|---|---|
| 4,948,091 | A | 8/1990 | Satoh et al. |
| 9,525,373 | B2 | 12/2016 | Shimura et al. |
| 10,948,099 | B2 * | 3/2021 | Matsumoto ............ F16K 31/047 |
| 2005/0218727 | A1 | 10/2005 | Gandel et al. |
| 2008/0284261 | A1 | 11/2008 | Andrieux et al. |
| 2017/0085203 | A1 | 3/2017 | Andrieux et al. |
| 2017/0331409 | A1 | 11/2017 | Andrieux et al. |
| 2017/0338726 | A1 | 11/2017 | Gandel et al. |
| 2017/0370493 | A1 | 12/2017 | Sigg et al. |
| 2017/0373555 | A1 | 12/2017 | Sigg et al. |
| 2018/0219435 | A1 | 8/2018 | Billet et al. |
| 2019/0229587 | A1 | 7/2019 | Watrin et al. |
| 2019/0252944 | A1 | 8/2019 | Watrin et al. |
| 2019/0285190 | A1 | 9/2019 | Equoy et al. |
| 2020/0025306 | A1 | 1/2020 | Monnin et al. |
| 2020/0099274 | A1 | 3/2020 | Watrin et al. |

* cited by examiner

COMPACT CONTROL VALVE

CROSS-REFERENCE TO RELATED APPLICATIONS

This application is a National Phase Entry of International Patent Application No. PCT/FR2018/053112, filed on Dec. 5, 2018, which claims priority to French Patent Application No. 17/61853, filed on Dec. 8, 2017, both of which are incorporated by reference herein.

TECHNICAL FIELD

The invention relates to a compact control valve intended, for example, for a pressure regulator of an air conditioning circuit and which is actuated by a brushless electric motor.

The present invention is preferably intended for, but not limited to, the field of flow control valves for air conditioning or battery cooling circuits. The particularity of these systems is the need to maintain the heat transfer fluid in a sealed circuit. The generally adopted solution, ensuring this sealing while permitting lasting actuation, is to separate the fixed part, not submerged in fluid, of a brushless electric motor or a solenoid, generally the stator of the motor, from a mobile element moving in the fluid circuit, the separation being carried out by a sealed non-magnetic element. It is then possible to control the flow without affecting the sealing of the refrigeration circuit. These regulation systems are required to be very compact, energy efficient, highly accurate to control, and adaptable to the various mechanical configurations of the fluid circuit.

Due to new environmental standards and needs linked to vehicle electrification for reasons of obvious comfort, efficiency and sometimes risk, an increase in the need for precision and safety in the management of the complete air conditioning system has prompted requests for feedback on the position of the control needle of these expansion valves. Due to the need for energy efficiency, there is also therefore a need to detect the position of the active part of the valve during control.

The forces required during control are relatively high in relation to the volume of the system, with a maximum when the heat transfer fluid circuit is closed, when the needle rests on the valve seat. On the residual possible displacement of the needle, the forces decrease, the fluid passage section being increasingly large. There is therefore an advantage in adapting the force according to the position of the active part of the valve for the purpose of optimized electrical consumption.

Finally, these systems are present in the fields of industry or housing, but also in the field of motor vehicles where a need for compact integration is required. There is therefore a need for practical and integrated fixing of the actuator to the valve body.

BACKGROUND

In the oldest documents, expansion valves comprising a radial flux electric motor are known known from U.S. Pat. No. 4,650,156. The rotor is displaced helically during operation, guided by a screw-nut system, the screw part being secured to the rotor and the nut part being fixed and associated with the heat transfer fluid circuit. The helical movement of the rotor is only useful by its linear displacement transmitted to the needle and making it possible to control the flow of the fluid having to pass in gas phase and consequently the level of cooling of the system. Sealing is achieved by a system incorporating the stator and the rotor which are submerged in fluid.

In this same document, the rotor is of shorter axial length than the axial length of the stator. During displacement, the rotor part carrying the magnet remains opposite the magnetically conductive material of the stator, the torque generated by the electric machine therefore remains constant over the entire stroke. The force generated is therefore also constant over the actuator stroke. This embodiment poses a problem in terms of axial dimensions with a need for guidance on both sides of the rotor added to the fact that the axial height of the stator is greater than the rotor.

In this state of the art there is also, in JP Patent Publication No. 996210733, a method for direct fixing of the electrical part generating translation on the mechanical part dedicated to the passage of the heat transfer fluid by means of screws. This allows the installation of the electrical assembly in a simple and free manner in an angular position, but only applies for a direct actuated solenoid having a non-circular shape. The dimensions and performance are therefore not optimal and there are connecting pieces which impose axial stacking of the mechanical functions, which are still detrimental to the compactness of the assembly.

More recently, U.S. Patent Publication No. 2009/0294713 introduces a fixed screw and a guide within the rotor of the motor, in order to solve the above-mentioned problems, but the use of a motor with transverse flux causes damage to the assembly. The transverse flux machine has two electric phases superposed axially. The axial displacement of the rotor induces a progressive imbalance in the torque generated by each phase, so that the regularity of the total torque and therefore the performance is degraded. In addition, the stacking of the transverse motor phases penalizes the axial compactness.

A motor with transverse flux has two coils describing a circular torus whose axis is parallel to the main axis of movement, associated here with a screw-nut transformation. The fixed screw linked to the part associated with the coolant inlets is hollowed out in a shape of revolution and along the main axis of movement to allow the flow control needle to pass, the nut being mechanically linked to the rotor of the motor. The rotor of the motor is displaced helically during the operation of the expansion valve. It should be noted that, as in U.S. Pat. No. 4,650,156, the axial length of the rotor is shorter than the axial length of the stator part.

More recently still, U.S. Pat. No. 9,525,373 describes an angular sensor associated with a valve equipped with a motor with transverse flux, the fixed part surrounding the sealing bell describing a toroidal shape of revolution coaxial relative to the axis of the valve and having a lateral outlet. However, this sensor is only useful for detecting a stop by loss of synchronism between the mobile part of the sensor and the rotor part of the actuator and not the measurement of the absolute angular position of said rotor. Sensor performance should be expected to be poor given the strong influence of the motor coils on the Hall effect sensor described.

The purpose of these devices is to solve the general problem of linearly controlling a flow of fluid, for example heat transfer fluid, by associating a mechatronic system with a fluid circuit. However, the previously described devices always have a construction which leads to large axial dimensions with either a transformation of movement as well as guide elements located, axially, on either side of the electric motor, or a construction of the transverse flux electric motor inducing two superimposed coils.

From the perspective of having an analog position sensor, i.e. giving information proportional to a displacement, the use of a motor with transverse flux is not ideal because the magnetic flux produced by these coils exits largely above the motor and consequently disrupts the performance of the sensor when the latter is a magnetosensitive sensor. In addition, a sensor is not used to measure the axial displacement of the needle or the rotor in any of these patents. The electromagnetic solutions of Japanese Patent No. 996210733 and of U.S. Patent Publication No. 2009/0294713 are both magnetic topologies with axial flux generating magnetic fields along the axis of displacement and disrupting any magnetosensitive sensor.

In U.S. Pat. No. 4,650,156, the use of a sensor is not described and is not encouraged by the solution used. The entire motor is submerged in fluid and the addition of a sensor, a control circuit and a printed circuit would cause leakage and connection output problems.

In terms of the dimensions of the solutions, the solutions using motors with axial flux generally have lateral output connectors which induce a large contact area and large dimensions. In the event that a position sensor is used close to the axis of the needle, the electrical and mechanical connections of the different elements would be problematic due to the distance between the connectors of the two components.

SUMMARY

The present invention aims to overcome the drawbacks of the state of the art by making an actuator that is more compact and efficient than those of the prior art. It is also the object of the invention to optionally allow the use of a position sensor integrated into the motor and which makes it possible to determine the linear position of the needle. It is also the object of the invention to allow the use of a position sensor integrated into the motor and which makes it possible to determine the angular position of the rotor of the motor. It is also the object of the invention to allow the motor to be fixed easily and rigidly to the valve body without the use of welding and in limited dimensions.

According to particular embodiments, the invention relates to a device comprising an electric motor of not entirely cylindrical shape making it possible to clear areas where the fixing means can be integrated without interfering with the coils of the electric motor. According to other particular embodiments, the invention relates to a device comprising an electric motor of not entirely cylindrical shape, making it possible to clear areas where the fixing means can be integrated without interfering with the coils of the electric motor and outside the volume described by the housing carrying the stator part. The sealing of the electric motor against projections of external fluid is then facilitated.

The invention also relates to the implementation of a needle position sensor as well as a solution for increasing the accuracy of the axial sensor according to the temperature variations of the fluid, by introducing a thermally conductive element between the sealing bell where the part generating the magnetic field is located, and the magnetic measurement probe located outside. The latter can, by its internal architecture, be temperature compensated but it is located in the volume described by the housing, outside the bell separating the rotor from the stator, and can experience a temperature different from that of the fluid. The greatest accuracy is obtained when the temperature gradient is minimal between the probe and the element generating the field, the compensation then being achieved on the more precisely known field variation in temperature.

The invention relates more particularly to a valve for controlling the circulation of a fluid, having a valve body and a housing containing an electric motor composed of a stator and of a rotor, a needle, a sealing bell and also a fixed screw or a fixed nut, said fixed screw or said fixed nut being secured to the valve body, the stator being secured to the valve body via said housing, the sealing bell being positioned at the interface between the rotor and the stator in such a way that the screw/nut, the rotor and the needle are within this bell and submerged in said fluid, the stator being isolated from said fluid, the rotor having the function of a nut or of a screw and having a helical movement imposed by said fixed screw or said fixed nut and driving the needle axially, characterized in that the motor is a brushless polyphase motor with radial principal magnetic flux. Advantageously, it has a needle linear position sensor composed of a magnetosensitive probe secured to the housing outside said bell and detecting an axial component of the magnetic field, as well as at least one magnetic element secured to said needle or said rotor within said bell and generating said magnetic field and located within said bell. In order to allow insensitivity to mispositioning, said sensor may have a magnet connected to the probe outside the bell, the direction of magnetization of the magnet being in the axial direction of displacement of the needle and in the same orientation as that of the magnetic element.

In another implementation of a needle linear position sensor, this is composed of a magnetosensitive probe secured to the housing outside said bell and detecting an axial component of the magnetic field, at least one magnet secured to said probe outside the bell and generating said magnetic field as well as a magnetic element, in the form of a soft ferromagnetic piece, secured to the needle and located within said bell and modifying, at the level of the probe, the characteristics (intensity, direction, etc.) of the magnetic field emitted by said magnet. In these sensor solutions, alternatively, said probe is positioned near the bell and a thermally conductive element is placed at the interface between said probe and said bell.

The valve may alternatively have a rotor angular position sensor composed of a magnetosensitive probe detecting and processing the two Cartesian components of the magnetic field or the phase of the magnetic vector in a plane orthogonal to the axis of axial displacement of the needle and near the axis of rotation of the motor, said probe being located outside said bell, as well as at least one magnetic element generating said magnetic field and located within said bell, secured to said rotor. In this case, the magnetic element emitting the field is, for example, an axial bipolar magnet.

To allow the actuator to be fixed to the valve body, the invention also relates to a valve body which has a flat receiving surface and a housing fixed to said valve body on said receiving surface by axial fixing means, the stator having a triangular shape and at least one fixing element is placed between the vertices of said triangular shape. In this case, the fixing elements are alternately located at least partially within a circle passing through said vertices of the triangular shape or else the stator has an at least partially circular external shape and at least one fixing element is placed outside the stator part of the motor and at least partially within a circle inscribed on the stator.

BRIEF DESCRIPTION OF THE DRAWINGS

Other characteristics and advantages of the invention will emerge on reading the following detailed embodiments, with reference to the appended drawings which represent respectively.

DETAILED DESCRIPTION

Figure 1:
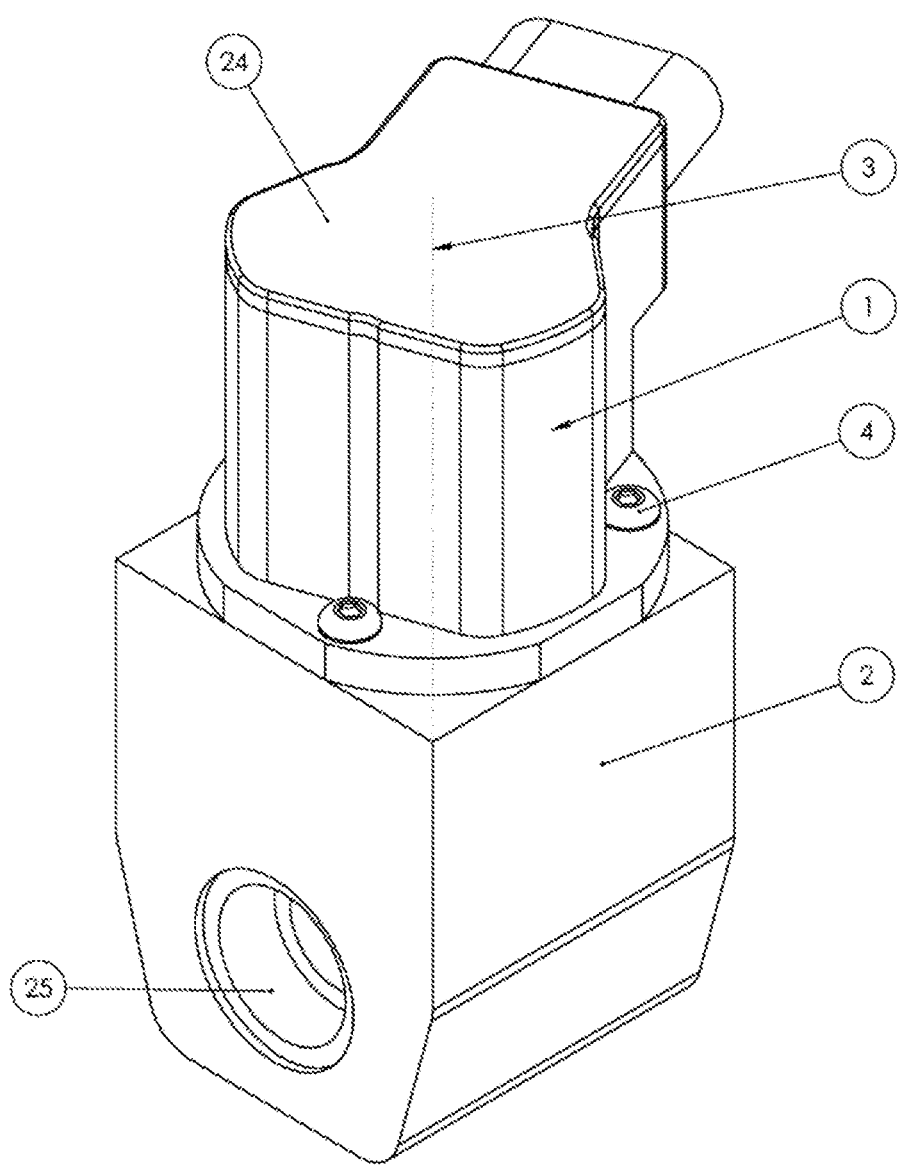
FIG. 1 is a perspective view of a valve according to the invention in a first embodiment of the invention.

FIG. 1 shows an isometric view of a first embodiment of a valve according to the invention, associating an electrical actuation assembly and a mechanical assembly creating a circulation path for a heat transfer fluid. The valve is thus more particularly composed of an electric actuator (1) which sets in translation, along the axis (3) of displacement, a needle (not visible here) using an electric motor. The actuator (1) is fixed to the valve body (2) which comprises the passage channels (25) of a heat transfer fluid whose flow is managed by said needle. The electric actuator (1) comprises a cover (24) on the upper part, and is fixed to the valve body (2) by axial fixing means (4) such as screws or bolts.

Figure 2:
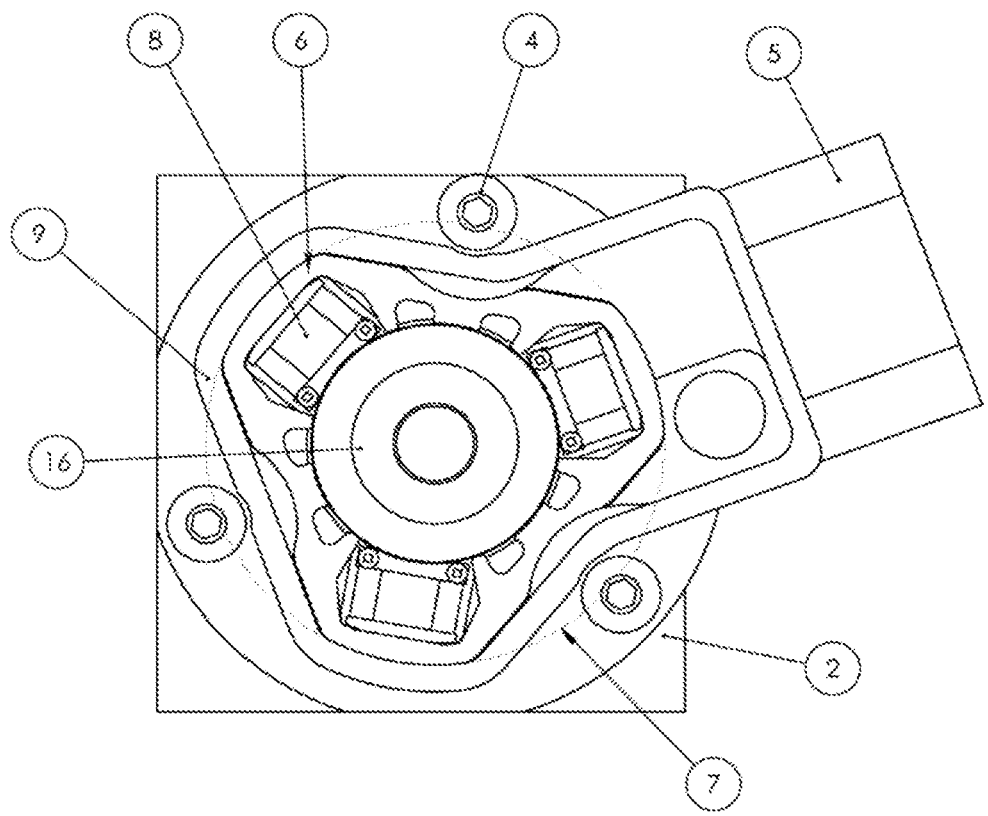
FIG. 2 is a top view of the device of FIG. 1 with no cover.

FIG. 2 is a top view of the first embodiment with no cover and making it possible to appreciate the electric actuator with radial magnetic flux typically used in the present invention. This actuator (1) has a stator (6) formed by a laminated core forming teeth, on some of which electric coils (8) are placed, here three coils at 120° from one other. The particular shape of the stator, triangular here, makes it possible to accommodate axial fixing elements (4) without increasing the overall contact area of the actuator on the valve body (2). The angular freedom of positioning of these elements allows easy orientation of the actuator, particularly of its connector (5), according to the needs of the entire air conditioning system. A simple flat contact area of the valve body (2) thus allows the reception of this actuator which does not have a symmetry of revolution. In particular, the circle inscribed (7) in the triangular shape of the stator (6) fictitiously intersects, and in axial projection, the fixing elements (4). The actuator (1) is enclosed by a housing (9) which can be a housing in which the actuator (1) is placed or else an overmolded plastic material. In this view with no cover (24), we also appreciate the presence of a sealing bell (16) inside which the rotor of the actuator (1) as well as the needle to be displaced are placed, these elements being submerged in the heat transfer fluid. Isolated from the heat transfer fluid, the stator (6) and the coils (8) are outside this bell.

Figure 3:
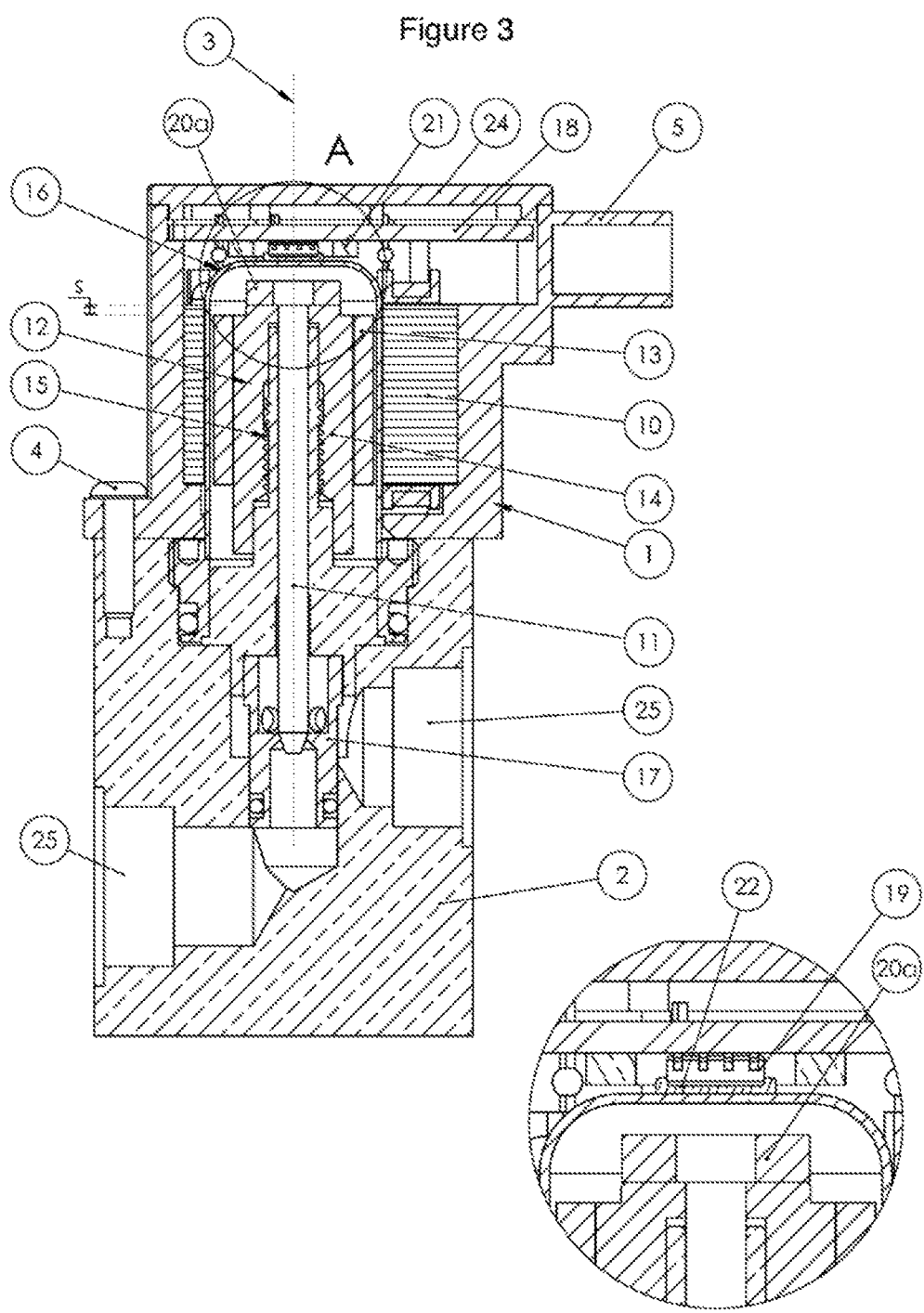
FIG. 3 is a longitudinal sectional view of the device of FIG. 1 with an enlarged area view.

FIG. 3 represents a longitudinal section of a valve according to this first embodiment. The actuator (1) is screwed onto the valve body (2) using the fixing elements (4). The valve body (2) has heat transfer fluid inlet and outlet circulation channels (25). Fluid passage is managed by the positioning of the end of the needle (11) managed by the electric actuator (1), along the axis (3), in order to move this end of the needle (11) closer to or further away from the needle seat (17). The rotor (12) is composed of a nut part (14) and which here also forms, in this particular embodiment, the yoke and the support of the permanent magnets (13), the rotor setting the needle (11) in motion by a connection which is secured here but which can be indirect via a spring at the interface (not shown). The nut part (14) can be ferromagnetic in order to allow the guidance of the magnetic flux of the magnets (13) and have a mechanical function in order to guarantee the viability of the movement transformation. The movement of the rotor (12) and therefore of the needle (11) is along a helical trajectory thus combining a rotation, that of the electric machine formed by the rotor (12) and the stator (6), and a translation, imposed by the screwing of the nut part (14) onto the (here) fixed screw (15) and secured to the valve body (2). The movement is helical but only the translational component is mechanically important for controlling the valve, the needle having a geometry of revolution.

Figure 7:
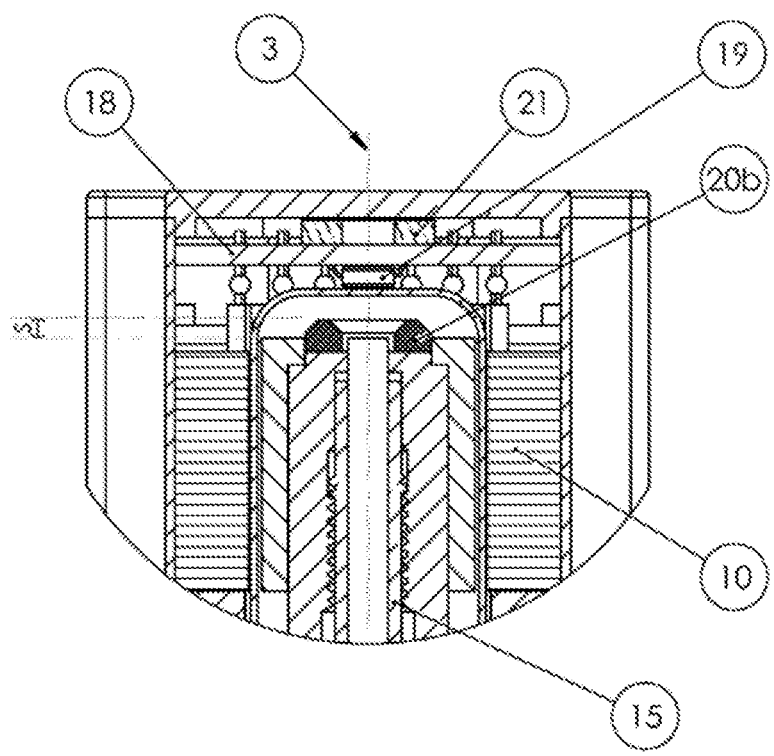
FIG. 7 is a longitudinal and detailed sectional view of a solution having an alternative to a position sensor used in the present invention.

In this embodiment, the axial height of the rotor (12) is less than that of the laminated core (10) so that, during the displacement of the rotor in its helical movement, the linear stroke S of which is delimited in FIG. 3 and FIG. 7, the rotor always radially faces the stator. In the case of FIG. 3, the valve is shown in the closed position and the rotor can therefore go back into the stator without changing the active surfaces facing each other between rotor and stator. The torque generated by the motor and therefore the force applied to the needle (11) are thus not affected during displacement. It should be noted that, if one wishes to optimize the active height, it is possible to consider increasing the height of the magnet to a height greater than or equal to that of the laminated core (10) of the stator (6), as illustrated in FIG. 7, which optionally allows the force to be modulated for an identical electric control current. When the needle (11) is raised, the active surfaces between the rotor and the stator are then scalable, which creates a variable force when the valve opens, making it possible to adapt the actuator to the decrease in pressure forces applied to the needle (11).

The configuration presented here is particularly axially compact with guidance entirely provided in the active height of the laminated core (10), this guidance being produced here by the screw (15) in cooperation with the nut (14) and by the body of the needle (11) with the inner surface of the fixed screw.

In this configuration of FIG. 3, and because the use of a radial flux actuator allows this more easily, a needle (11) position sensor is shown. This magnetic principle sensor is located on the upper part of the valve, above the rotor (12). A magnetized magnetic element (20a) is connected to the nut part (14), therefore to the rotor (12) and therefore to the needle (11). This magnet, which has an axial magnetization along the axis (3), is also submerged within the bell (16). During the helical displacement of the rotor (12), this magnetic element (20a) therefore moves away from or closer to the bottom of the bell (16). Opposite the bell (16) and outside said bell (16), positioned on the axis (3) is a magnetosensitive probe (19) detecting the amplitude of the axial component of the magnetic field on the axis (3) emitted by the magnetic element (20a). The distance or approximation of this magnetic element (20a) relative to the magnetosensitive probe (19) thus makes it possible to modulate the amplitude of field detected by the probe (19) and to give the image of the position of the needle (11). The importance is given here to the axis of axial sensitivity of the probe (19) because a motor with radial magnetic flux generates, on the axis (3), a magnetic field with an axial component much lower than that created by a motor with transverse flux. The axial component produced here is only a leak while it is a main path for the motor of the prior art.

The probe (19) is carried by a printed circuit (18) located above the bell (16), under the cover (24). This printed circuit (18) also carries the connection points to the coils (8) of the actuator (1) as well as the electronic components necessary to control the polyphase electric motor. The printed circuit (18) also supports, around the probe (19), a compensation magnet (21) which can be optionally used to control the average level of induction around zero gauss and thus improve the temperature behavior of the sensor. In this case, the compensation magnet will have a direction of axial magnetization in the same direction as the direction of magnetization of the magnetic element (20a).

The magnetic element (20a) generating the axial magnetic field is produced by neodymium-iron-boron, ferrite or samarium-cobalt magnets. This latter material has the advantage of a small variation in its magnetic properties according to temperature, thus minimizing the drift of the sensor signal and minimizing the influence of temperature gradients between the fluid and the magnetic field measurement probe. In order to improve the temperature uniformity between the magnetosensitive probe (19) and the magnetic element (20a) emitting the field which are located respectively outside and within the bell (16), and in order to allow a more efficient temperature compensation, a thermally conductive element (22) can be placed at the interface between the bell (16) and the probe (19), making it possible to bring the probe (19) to a temperature close to that within the bell and therefore to a temperature close to that of the magnetic element (20a).

Figure 4:
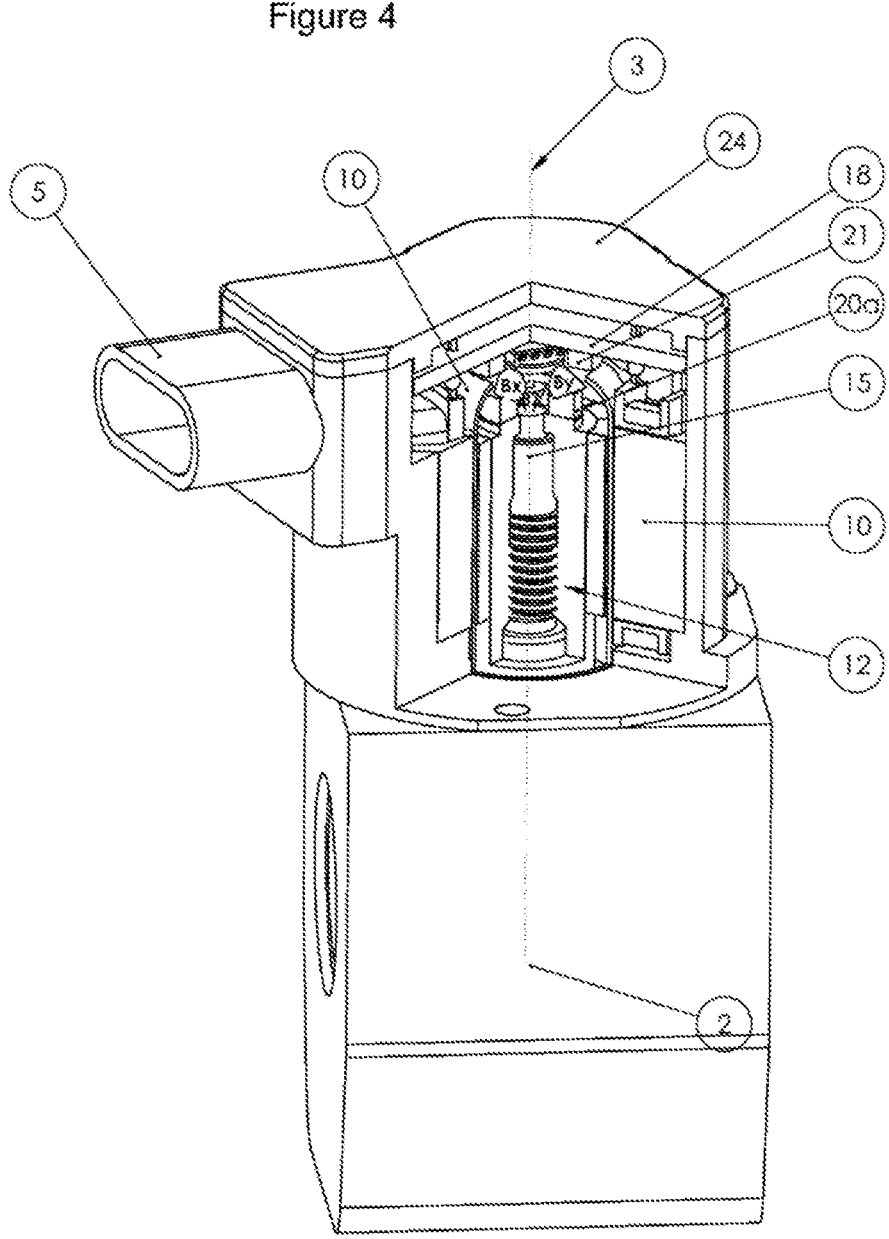
FIG. 4 is a perspective and partial sectional view of the device of FIG. 1.

FIG. 4 shows a partial sectional view of this first embodiment which makes it possible to appreciate in more detail the screw (15) and the components described above, in particular a variant of the position sensor. This position sensor can be used to, for example, control the motor in a closed loop or simply to ascertain the position of the needle and ensure that it is in the desired position. To this end, the probe (19) can have a magnetic sensitivity to the amplitude of the two components of the magnetic field orthogonal to the axis of displacement or else a sensitivity to the phase of the vector of the magnetic field orthogonal to the axis of displacement, in order to determine the only angular position of the rotor. The probe (19) can also have a magnetic sensitivity to the amplitude of the three components of the magnetic field or a sensitivity to the phases of the magnetic vectors of the magnetic element (20a) respectively in the plane orthogonal to the axis of displacement and along the axis of displacement, in order to determine both the angular position of the rotor but also the axial position. The use, for example, of an MLX90363 type probe makes it possible to measure these three components of the magnetic field. The solution devised proposes to measure the axial distance from the probe (19) to the rotor (12), with an output of the type proportional to this distance and preferably with the axial component of the field on the axis, and the absolute rotary position of the rotor (12) on a lathe, with a periodic sine/cosine type output with the components orthogonal to the axial component. It is also to be considered that the solution allowing the amplitude of the two components of the magnetic field to be measured also indirectly gives access to the axial position by calculating the modulus of the two coplanar components at the axis of displacement. This module varies according to the distance between the magnetic element (20a) and the probe (19). The magnet generating the magnetic field can, for example, be the magnetic element (20a) having an axial bipolar magnetization. The measurement point of the probe (19) will then be placed judiciously relative to the magnetic element (20a) in order to exploit the two or three components or the phases of the vectors of the magnetic field. Knowing the absolute position of the rotor (12) on a lathe makes it possible to consider piloting it in a closed loop, while knowing the axial position of the rotor (12) makes it possible to manage the opening/closing of the needle connected to the rotor. Knowing the position of the rotor alone already enables more robust FOC or sinusoidal control than in pure stepper mode.

In order to more completely overcome the magnetic field produced by the stator, the use of a "double die" probe, i.e. with two neighboring magnetosensitive elements, can be considered within the framework of a differential measurement. Shielding located near the coils in order to short-circuit the stray field emitted by it and/or close to the probe also constitutes an even more robust solution.

Figure 5:
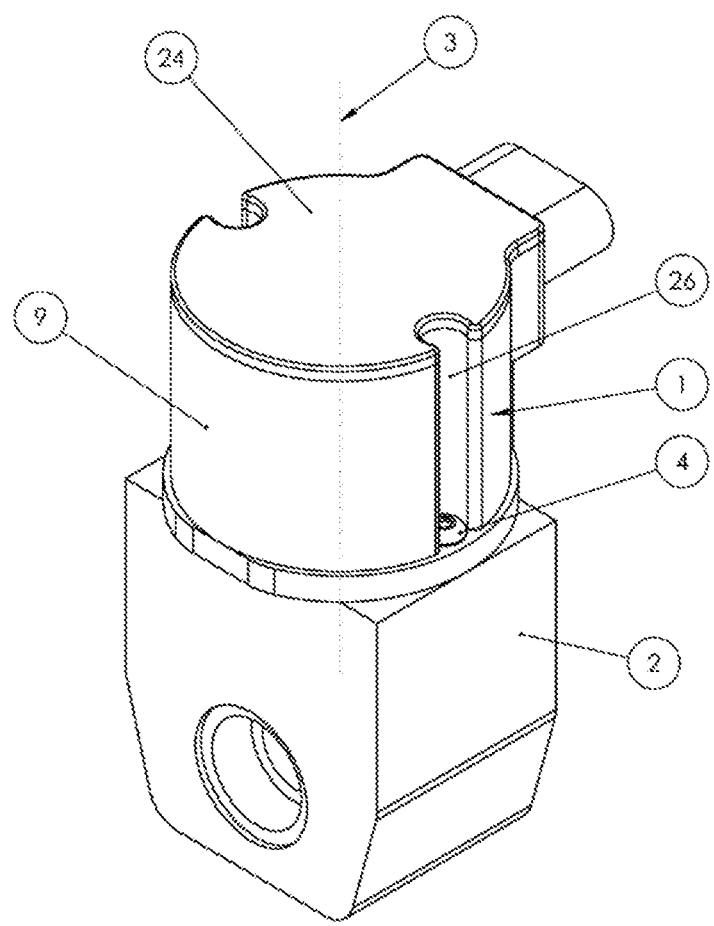
FIG. 5 is a view of a valve according to the invention in a second embodiment of the invention where the electric motor has a larger number of coils compared to the first embodiment.

FIG. 5 shows a second variant of use where the motor uses a number of electrical coils greater than three (six are shown here), thus modifying the external contact area of the stator. This configuration is advantageous in cases where the force requirements linked to the control of the fluid, more precisely due to the pressure differences between the various elements of the fluid circuit, are significant. The increase in the number of coils increases the force factor produced by the actuator for a given electrical power at the input of the actuator. This second variant is also distinguished from the first in that the housing (9) has a generally tubular shape with two axial clearances (26) on the periphery in order to allow fixing using the fixing elements (4).

Figure 6:
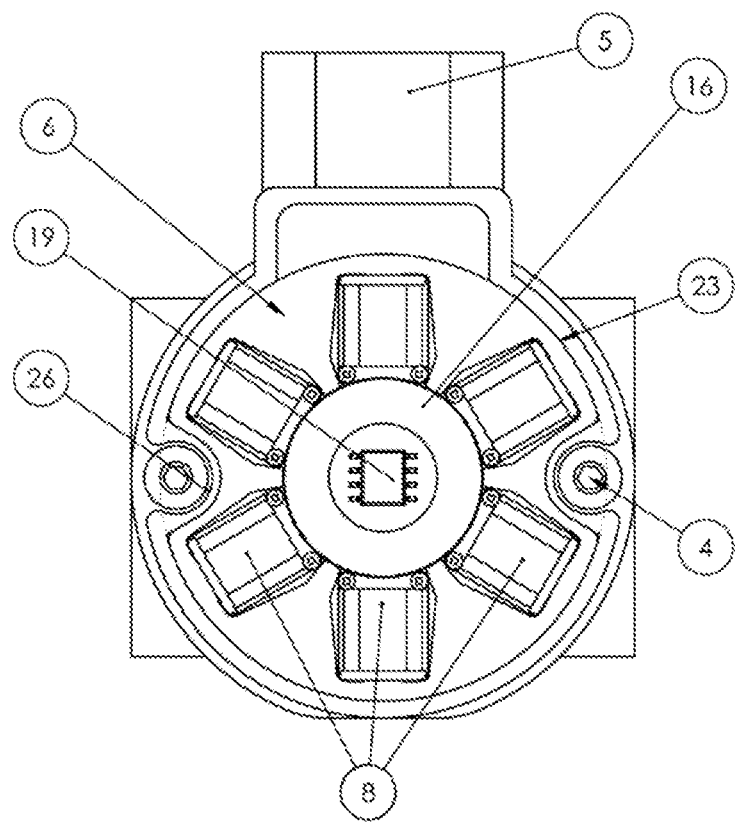
FIG. 6 is a top view and in cross section of the device of FIG. 5.

FIG. 6 shows the detail of the magnetic circuit of the actuator (1), the fixing elements (4) being located within the circle (23) inscribed on the outside of the stator and between the six coils (8) of this stator part. The number of fixing elements (4) is not limiting. Two are shown here but more than two can be considered. The total contact area of the actuator with its fixing elements (4) is thus minimized on the valve body and its rectangular shape. Again, the orientation of the connector (5) can be variable thanks to the positioning principle and the fixing elements selected. The probe (19) is shown isolated above this stator in a preferred position, on the axis of displacement (not shown here).

FIG. 7 shows an alternative embodiment of the position sensor. In this embodiment of the sensor, the magnetic element (20b) is a soft ferromagnetic element which does not emit a magnetic field but which modifies the intensity of the magnetic field emitted by the magnet of the sensor (21) surrounding the probe (19), and detected at the level of the probe (19) during the axial movement of this magnetic element (20b). The magnetic element (20b) can be located on either side of the printed circuit (18), always outside the bell (16). The advantage of this solution is to juxtapose the probe (19) and the magnet of the sensor (21) in order to allow improved compensation of the variation of the magnetic field with the temperature.

In general, the sensors described in the previous examples are integrated in the rotor but the invention also applies to cases in which the magnetic element (20a) or (20b) is integrated in the upper end of the needle (11).

Figure 8:
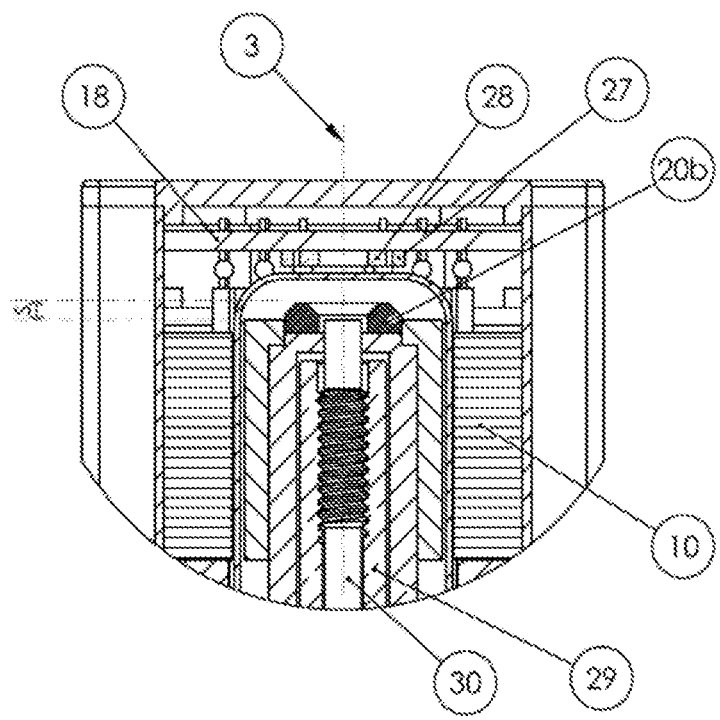
FIG. 8 is a longitudinal and detailed sectional view of an alternative embodiment where the rotor forms a screw and where the sensor used is of inductive physical principle.

FIG. 8 shows an alternative embodiment of the sensor which can be used, this being of inductive principle. The latter is composed of a passive magnetic element (20b) secured to the rotor within the bell and two electric coils (27, 28). The general principle, classic for an inductive sensor, is as follows:

a first coil (27) emits a variable magnetic field, a second coil (28) receives a variable magnetic field by inductive coupling, the magnetic element (20b) modifies the inductive coupling between the coils (27, 28) when it is moved away from or axially moved closer to the coils (27, 28). This modification of the coupling induces a different response—for example, in terms of phasing or amplitude of the signal detected—at the level of the coil (28) which makes it possible to relate the detected signal and the position.

FIG. 8 also shows an alternative embodiment of coupling of the rotor with the valve body (2). In this example, the rotor is attached to the needle (11) which forms a screw (30) which cooperates with a fixed nut (29) linked to the valve body (2). This is unlike the previous examples where the rotor forms a nut and cooperates with a fixed screw portion linked to the valve body (2). The invention is not limited in terms of screw/nut functions which can be carried out either by the rotor or at the level of the valve body (2).

In all the examples presented here, which are not exhaustive, it is obvious that the sensor solutions are not limited to the choice of using a screw or nut at the level of the rotor or the valve body (2), and taking a sensor solution and adapting it to one of the mechanical solutions envisaged can be considered.

The invention claimed is:

1. A valve for controlling the circulation of a fluid, the valve comprising a valve body and a housing containing an electric motor including a stator and a rotor, a needle, a sealing bell and also a fixed screw or a fixed nut, the fixed screw or the fixed nut being secured to the valve body, the stator being secured to the valve body via the housing, the sealing bell being positioned at the interface between the rotor and the stator in such a way that the screw/nut, the rotor and the needle are within this bell and submerged in the fluid, the stator being isolated from the fluid, the rotor having the function of a nut or of a screw and having a helical movement imposed by the fixed screw or the fixed nut and driving the needle axially, wherein the motor is a brushless polyphase motor with radial principal magnetic flux.

2. A valve according to claim 1, further comprising a needle linear position sensor including a magnetosensitive probe secured to the housing outside the bell and detecting an axial component of the magnetic field, as well as at least one magnetic element (20a) secured to the needle or the rotor within the bell and generating the magnetic field.

3. A valve according to claim 2, wherein the probe is positioned near the bell and in that a thermally conductive element is placed at the interface between the probe and the bell.

4. A valve according to claim 2, wherein the sensor has a magnet secured to the probe outside the bell, the direction of magnetization of the magnet being in the axial direction of displacement of the needle and in the same orientation as that of the magnetic element.

5. A valve according to claim 1, further comprising a needle linear position sensor including a magnetosensitive probe secured to the housing outside the bell and detecting an axial component of the magnetic field, at least one magnet secured to the probe outside the bell and generating the magnetic field as well as a magnetic element, in the form of a soft ferromagnetic piece, secured to the needle and located within the bell and modifying, at the level of the probe, the characteristics of the magnetic field emitted by the magnet.

6. A valve according to claim 1 further comprising a rotor angular position sensor including a magnetosensitive probe detecting and processing two Cartesian components of a magnetic field or a phase of a magnetic vector in a plane orthogonal to the axis of axial displacement of the needle and near the axis of rotation of the motor, the probe being located outside said bell, as well as at least one magnetic element secured to the rotor generating the magnetic field and located within the bell.

7. A valve according to claim 6, wherein the magnetic element emitting the field is an axial bipolar magnet.

8. A valve according to claim 1, wherein the valve body has a flat receiving surface and the housing is fixed to the valve body on the receiving surface by axial fixing means, the stator has a triangular shape and at least one fixing element is between vertices of the triangular shape.

9. A valve according to claim 8, wherein the fixing elements are located at least partially within a circle passing through the vertices of the triangular shape.

10. A valve according to claim 1, wherein the valve body has a flat receiving surface and the housing is fixed to valve body on receiving surface by axial fixing means, the stator has an at least partially circular external shape, and at least one fixing element is outside the stator part of the motor and at least partially within a circle inscribed on the stator.

* * * * *